United States Patent
Kotzur et al.

(10) Patent No.: US 9,903,715 B2
(45) Date of Patent: Feb. 27, 2018

(54) MEASURING SYSTEM AND METHOD FOR MARKING A KNOWN TARGET POINT IN A COORDINATE SYSTEM

(71) Applicant: LEICA GEOSYSTEMS AG, Heerbrugg (CH)

(72) Inventors: Norbert Kotzur, Alstätten (CH); Jürgen Mayer, Widnau (CH)

(73) Assignee: LEICA GEOSYSTEMS AG, Heerbrugg (CH)

(\*) Notice: Subject to any disclaimer, the term of this patent is extended or adjusted under 35 U.S.C. 154(b) by 784 days.

(21) Appl. No.: 14/347,562

(22) PCT Filed: Sep. 26, 2012

(86) PCT No.: PCT/EP2012/069009
§ 371 (c)(1),
(2) Date: Mar. 26, 2014

(87) PCT Pub. No.: WO2013/045517
PCT Pub. Date: Apr. 4, 2013

(65) Prior Publication Data
US 2014/0232859 A1    Aug. 21, 2014

(30) Foreign Application Priority Data
Sep. 27, 2011    (EP) .................................... 11182875

(51) Int. Cl.
*G01C 1/04*    (2006.01)
*G01C 15/00*    (2006.01)
(Continued)

(52) U.S. Cl.
CPC ............. *G01C 1/04* (2013.01); *G01C 15/002* (2013.01); *H04N 7/183* (2013.01)

(58) Field of Classification Search
CPC ..................................................... H04N 7/183
See application file for complete search history.

(56) References Cited

U.S. PATENT DOCUMENTS 7,222,021 B2    5/2007    Ootomo et al.
7,647,199 B2    1/2010    Green et al.
(Continued)

FOREIGN PATENT DOCUMENTS

CN    101809407 A    8/2010
DE    19710722 A1    10/1997
(Continued)

OTHER PUBLICATIONS

European Search Report dated Jun. 19, 2012 as received in Application No. EP 11 18 2875.

*Primary Examiner* — Obafemi Sosanya
(74) *Attorney, Agent, or Firm* — Maschoff Brennan

(57) ABSTRACT

A measuring system for marking a known target point in a coordinate system includes a mobile marking unit and a geodetic measuring device. The measuring device has a sighting unit, angle measurement functionality, and a camera for capturing a camera image. The measuring system has a database storing a target point position, an output unit that presents the camera image, and a control and processing unit. The measuring system has presentation functionality that presents a spatial deviation between the marking unit and target point positions on the output unit in first and second directions using, respectively, using first and second deviation displays. The first deviation display indicates a distance of the target point position from a plane defined by the measuring device and the marking unit. The second deviation display indicates a distance of the target point position from a normal to the plane defined by the marking unit position.

11 Claims, 8 Drawing Sheets

(51) Int. Cl.
*H04N 7/18* (2006.01)
*G06Q 10/06* (2012.01)

(56) References Cited

U.S. PATENT DOCUMENTS

| | | | |
|---|---|---|---|
| 8,553,212 B2 | 10/2013 | Jaeger et al. | |
| 2006/0192946 A1 | 8/2006 | Walser | |
| 2010/0188407 A1* | 7/2010 | Nielsen | G06Q 10/06 345/440 |
| 2010/0315286 A1* | 12/2010 | Cerniar | G01C 15/002 342/357.25 |
| 2011/0305260 A1* | 12/2011 | McManus | G01S 19/07 375/130 |

FOREIGN PATENT DOCUMENTS

| | | |
|---|---|---|
| DE | 199 267 06 A1 | 12/1999 |
| DE | 199 495 80 A1 | 4/2000 |
| EP | 1 293 755 A1 | 3/2003 |
| EP | 1 686 350 A1 | 8/2006 |
| EP | 1 734 336 A1 | 12/2006 |
| JP | 2002-195829 A | 7/2002 |
| WO | 2010/100043 A1 | 9/2010 |

* cited by examiner

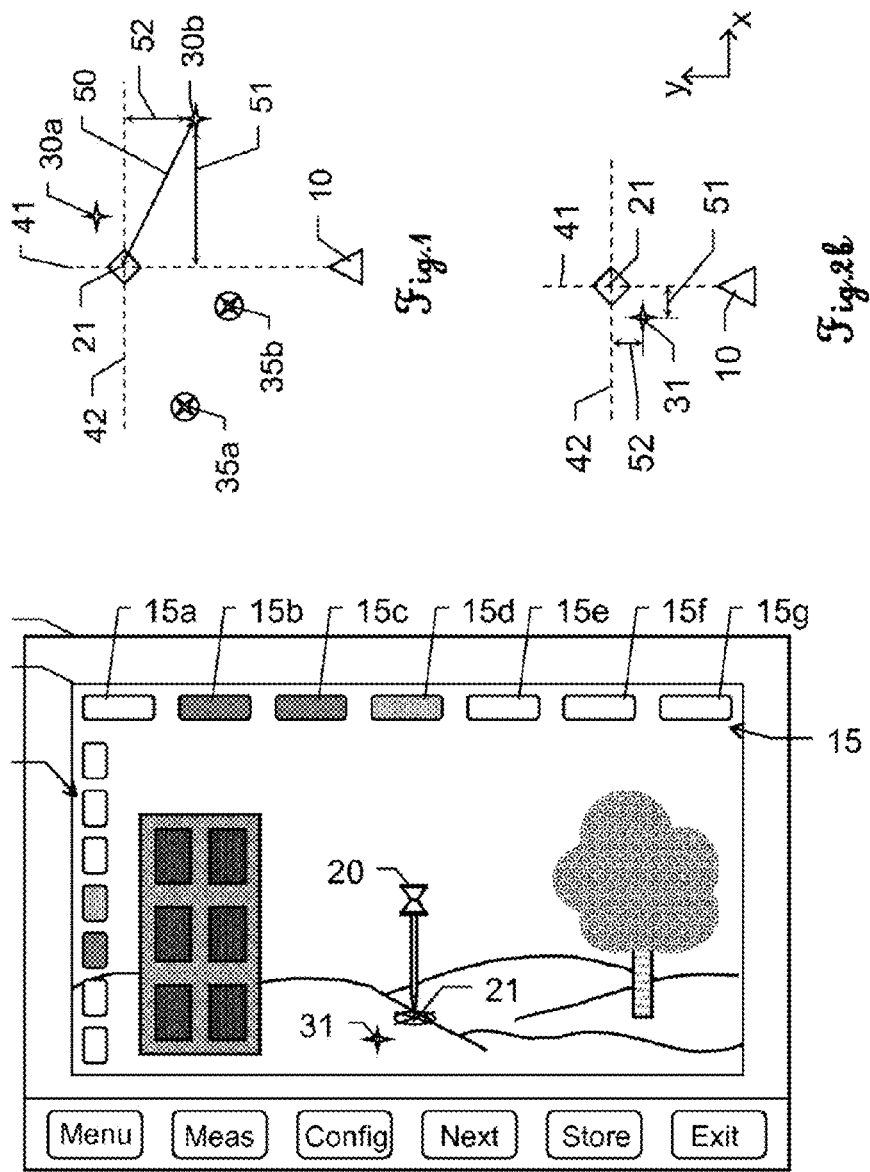

MEASURING SYSTEM AND METHOD FOR MARKING A KNOWN TARGET POINT IN A COORDINATE SYSTEM

FIELD OF THE INVENTION

The invention relates to a surveying system for marking a target that is known in a coordinate system, having a mobile marking unit and a geodetic surveying appliance, an inventive geodetic surveying appliance and an inventive geodetic marking method for marking a target.

BACKGROUND

Numerous geodetic surveying appliances have been known for surveying one or particularly more targets since ancient times. In this context, the range and direction or angle from a measuring appliance to the target to be surveyed are recorded and also, in particular, the absolute position of the measuring appliance together with any existent reference points are captured as spatial standard data.

Generally known examples of such geodetic surveying appliances are a theodolite, a tachymeter and a total station, which is also called an electronic tachymeter or computer tachymeter. A geodetic measuring apparatus from the prior art is described in the published document EP 1 686 350, for example. Such appliances have electrosensory angle and distance measuring functions that allow a direction and distance to a selected target to be determined. In this case, the angle and distance variables are ascertained in the internal reference system of the appliance and may also need to be linked to an external reference system for absolute position determination.

In many geodetic applications, points are surveyed by placing specially designed target objects at said points. These usually consist of a plumb rod having a targetable module, e.g. with a reflector for defining the measurement path or the measurement point. These target objects are targeted by means of a surveying appliance, a direction and a distance to the objects are determined and hence a position of the objects is derived.

In a similar manner to this point surveying, it is possible to mark targets that already have known coordinates or points whose position has been defined in advance of a marking process. In contrast to point surveying, in this case the position and the coordinates of the points to be marked are known and need to be marked. Such a process usually likewise involves the use of a plumb rod or surveying rod that is carried by a user and is positioned on a target. To this end, the user can approach the target position of the target on the basis of position information generated by the surveying appliance, the surveying rod being automatically targeted by the surveying appliance by a second person or by automation associated with the surveying appliance. Once the target has been reached, the user can mark the point.

Modern surveying appliances such as a total station have microprocessors for digital further processing and storage of captured measurement data. The appliances are usually manufactured in a compact and integrated design, with coaxial distance and angle measuring elements and also computation, control and memory units usually being integrated in one appliance. Depending on the expansion level of the total station, means for motorizing the target optical system, for reflectorless path measurement, for automatic target searching and tracking and for remote control of the overall appliance are integrated.

Furthermore, total stations known from the prior art have a radio data interface for setting up a radio link to external peripheral components, such as to a data capture appliance, which may particularly be in the form of a hand-held data logger, remote control unit, field computer, notebook, small computer or PDA. The data interface can be used to output measurement data captured and stored by the total station for external further processing, to read externally captured measurement data for storage and/or further processing into the total station, to input and output remote control signals for remotely controlling the total station or a further external component, particularly in mobile field use, and to load control software into the total station.

To sight or target the target to be surveyed, geodetic surveying appliances of the type in question have, by way of example, a telescopic sight, such as an optical telescope, as a sighting device. The telescopic sight is generally able to rotate about a vertical axis and about a horizontal tilt axis relative to a base of the measuring appliance, so that the telescope can be oriented to the point to be surveyed by means of swiveling and tilting. Modern appliances can have, in addition to the optical viewing channel, a camera, integrated into the telescopic sight and having a coaxial or parallel orientation, for example, for capturing an image, wherein the captured image can be presented particularly as a live image on the display of the indicator control unit and/or on a display of the peripheral appliance used for remote control—such as the data logger or remote control unit. In this case, the optical system of the sighting device may have a manual focus—for example an adjusting screw for altering the position of a focusing optical system—, may have an autofocus, with the focus position being altered by servomotors, for example, or may have fixed focusing in conjunction with a wide angle lens. Automatic focusing devices for telescopic sights on geodetic appliances are known from DE 197 107 22, DE 199 267 06 or DE 199 495 80, for example.

EP 1 734 336 discloses a surveying system having a target unit that has a reflector and also an optical receiver and transmitter. In this case, it is proposed that the optical transmitter of the target unit be used for supporting the automatic target searching process, inter alia. Thus, following reception of the search or measurement radiation, the target object can transmit its own identification, such as the reflector number or the reflector type, back to the surveying station using the transmitter of the target unit. The surveying station can therefore identify the sought target object and configure itself in optimum fashion for the target object.

A common feature of the aforementioned surveying systems from the prior art is that, possibly also using a camera, the target unit or a surveying rod provided with the target unit is targeted or observed by a stationary position determination unit, such as a total station. However, no automated guidance of an operator, using the image data recorded by the stationary position determination unit, to a provided target for the purpose of marking the latter is disclosed, which means that the marking process is relatively laborious for an operator and has considerable associated time involvement if precise marking of the target needs to be ensured.

For a solution to this problem, U.S. Pat. No. 7,222,021 and the corresponding EP 1 293 755 propose a surveying system, referred to as a user guidance system in this patent specification, having a stationary base station corresponding to a stationary position determination unit, which is equipped with depiction means, such as a camera, and a mobile station having the function of a mobile target unit, which is equipped with display means, such as a display for presenting a current position of the user on the basis of stored landscape images or data and current images, seen from the stationary measuring unit. Furthermore, it is disclosed how a user can be guided to the target by means of correlation between the position data for the mobile station that are currently measured from the stationary measuring station and stored data from the envisaged position of the target by marking on the display of the target unit. This can be supported by the use of a camera image, with the user being able to be guided by a direction and distance display, for example, by means of an arrow on the display.

Although this system described in U.S. Pat. No. 7,222,021 and in the corresponding EP 1 293 755 can be used to speed up the process of marking a target, the disclosure does not reveal any possibilities for improving the accuracy of the marking of the target. Real images are captured only by means of the stationary total station, which is remote from the mobile station, while the mobile station, such as a plumb rod with reflector, is guided using only synthetic, calculated presentations from a bird's eye perspective on a mobile display.

Accordingly, one disadvantage is that the user with a plumb rod cannot be guided without restriction on the basis of a real presentation of the terrain. In particular, this is the case when there is a relatively great distance between the total station and the target and a simultaneous relatively short range between the plumb rod and the target. Guidance by means of an arrow presented in the image is difficult or impossible in this case—on account of a constant camera perspective or because, when targeting the reflector on the plumb rod, the camera is likewise oriented thereto and hence the terrain is captured from a perspective that does not or does not fully permit simultaneous presentation of the arrow from the plumb rod position to the target position in the image. In addition, the display of the arrow in the display can—depending on the guidance direction—conceal a portion of the camera image such that obstacles in the immediate surroundings of the user, for example, or further targets to be surveyed are concealed.

SUMMARY

It is therefore an object of the present invention to provide a surveying system and associated units for the surveying system and also an appropriate surveying method that are able to be used to execute a marking process for targets more quickly, more accurately, in a more user-friendly fashion and more robustly. A specific object of the invention is to guide a user to a target such that he is continually provided—during the guidance process up until the target is reached—with information concerning the choice of an advantageous direction of movement, particularly the distance and direction to the next target, with the information being able to be used to reach and mark the target with high precision.

For the purpose of orientation in a terrain, a user of a surveying system can frequently be provided with different representations of the terrain on a display. For the purpose of guiding the user to a target, it is possible for graphical, synthetic, calculated presentations, for example, or really captured—e.g. by means of a camera—images of the terrain to be provided on a display. The user can therefore choose between the synthetic map view or the real camera image or can have both presentations displayed simultaneously. In the respective view that can be presented, it is additionally possible to display the targets to be marked and to provide the user with an orientation or guidance aid in this way.

Presentation of the terrain, particularly with a target, can afford a higher level of accuracy with respect to the desired target position being reached in comparison with a map view when a surveying rod is currently positioned close to the target. Furthermore, the camera image may reveal possible obstacles or terrain formations that can be displayed to the user only in part in a map view.

For a display for guiding the user to the next target, it is possible, by way of example, for both the current position of the user or of a mobile surveying rod that is carried by the user and the position of the next or a plurality of targets to be graphically displayed in the camera image. By way of example, when the camera is oriented to the surveying rod, one aspect of the invention relates—in the event of the next target not being in the field of vision of the camera and hence not being able to be depicted in the image—to a marking, presented on the image, that indicates the direction in which the next point is situated in relation to the field of vision of the camera.

If a distance between the position of the surveying rod and the position of the next target is so short that both the surveying rod and the target are in the field of vision of the camera at the same time, a marking unit position defined by the surveying rod and the target position are able to be referenced and presented in the image.

A piece of position information regarding the geodetic position of the targets is stored in a database of the surveying system, for example. For this, a user can define the points to be marked on an office computer, for example, and transmit them to the surveying system, particularly by wire, using Bluetooth, infrared or radio transmission technology. In this case, the points can be indicated individually by coordinates manually, can be provided together with a digital terrain model and/or can be stored both as information from a terrain model and manually. In addition, the user can input target information directly into the surveying system and can define additional targets, for example during the measuring or marking process.

To execute the marking process, the surveying appliance of the surveying system can be calibrated to a terrain by means of a calibration process, i.e. the surveying appliance can be set up at a setup point and points whose coordinates are known can be targeted in the terrain and surveyed in respect of angle and distance. From a number of known points that are surveyed according to the measurement task, it is thus possible to determine the position and the orientation of the surveying appliance with geodetic accuracy and to precisely perform further measurements on the basis of the calibrated surveying appliance.

For control of the surveying system, particularly for the orientation of a total station, a portable remote control unit may be provided that can be mounted in modularly detachable form on the surveying rod, for example. A user of the system may thus be provided with the opportunity to perform one-man surveying, i.e. the whole marking process can be executed by one person, for example by virtue of a display being arranged on the remote control unit and the display being used to display the camera image with the positions of the surveying rod and the target. For this, data captured by the surveying appliance can be transmitted to the remote control unit, particularly by means of radio, and processed thereon. The remote control can also be used by the user to send control commands to the surveying appliance and, by way of example, to perform angle and distance measurements for the surveying rod and hence to determine a precise geodetic position for the rod. In addition, it is possible to determine a position for the surveying rod by means of a GNSS antenna arranged on the rod, wherein position information transmitted by satellites is received and a current position for the antenna or for the rod is derived from the information.

Supported guidance for a user to a next target can be provided by means of the display provided on the remote control unit or on the surveying unit. In this case, the display can be used to present a difference between the current position of the surveying rod or the marking unit and the (next) target position, so that a user of the surveying system is provided with a piece of information about the way in which the target position can be reached, for example, particularly in respect of optimum movement by the user.

According to the invention, this is accomplished by virtue of at least two displays being presented in the camera image or on the display that each indicate a magnitude for a range to the target in a defined direction, particularly on the basis of the current position of the surveying rod relative to the surveying appliance. In this case, the indication may be in a graphical form such that, by way of example, a bar is presented that represents the range in an x direction and is in colored form according to the interval from the target, e.g. red for a long range and green for just a short remaining range to the target, and/or is dimensioned on the basis of the range or has a particular portion filled—in color. The second display, in particular presented as a bar again, also reflects a distance between the target and the current marking unit position in a second direction, e.g. a y direction. In a similar manner to the first display, the distance can be presented by means of a size for the display or by a colored indication. The inventive visualization of the range differences between a current actual position of a user (marking unit position) and a next target can be provided both within the context of polar marking, Cartesian marking, and marking by means of further reference points (e.g. sun, most recently marked point or a northerly orientation of the surveying appliance).

In addition, different scalings for the range rendition can be chosen for the indicators for a spatial discrepancy depending on the range from the current marking unit position of the surveying rod to the target position. By way of example, the next target may be at a range of approximately 100 meters from the marking unit position, with the discrepancy display (indicator) being presented such that this range is represented as an almost maximum deflection of the bar or as reddish coloring. If the user with the surveying rod now approaches the target to within 5 meters, the scaling of the presentation of the range between the positions can be adjusted such that a maximum deflection of the indicator or the presentation of the distance, for example, indicates a range of at least 5 meters and hence a more sensitive graduation is provided for an approach to the target. If the surveyor with the surveying rod is within a five meter radius around the target, he can use this more sensitive scale setting to be guided much more accurately in the direction of the target. If the surveyor now approaches further, for example to within 50 cm, the scaling can in turn become so coarse that it is only difficult to see from the discrepancy indicator whether further approach is taking place, for example to 40 cm or 30 cm. In this situation, the scaling can be changed over further and, by way of example, a full deflection of the indicator bar can indicate a remaining range of at least 50 cm to the target. The changeover or the change between the scalings can likewise be effected for an increasing range to the target, with the sensitivity of the indicator being able to decrease. In addition, the changeover can be effected automatically, particularly on the basis of ongoing interval determination and adjustment of the scaling, or can be performed manually by the user of the surveying system.

The invention accordingly relates to a surveying system for marking a target that is known in a coordinate system, having a mobile marking unit and a geodetic surveying appliance, particularly for determining the position of the marking unit. In this case, the marking unit is designed such that a marking unit position for the marking unit can be determined with high precision, particularly wherein the marking unit has a customizable reflector and/or a GNSS antenna for determining the marking unit position. In addition, the surveying appliance has at least a targeting unit that defines a targeting direction, particularly a telescope, an angle measuring functionality and a camera for capturing a camera image. Furthermore, a target position-stored in a database—for the target and an output unit, particularly a display, on which the camera image, particularly together with the target position can be presented and/or the marking unit position, are present. In addition, the surveying system has a control and processing unit. The surveying system has a presentation functionality that, when the presentation functionality is executed under the control of the control and processing unit, involves a spatial discrepancy between the marking unit position and the target position being graphically presented on the output unit. The discrepancy is presented in a first direction by means of a first discrepancy indicator, wherein the first discrepancy indicator indicates an interval from the target position to a plane defined by the surveying appliance and the marking unit, and in a second direction by means of a second discrepancy indicator, wherein the second discrepancy indicator indicates an interval from the target position to a normal to the plane, which normal is stipulated by the marking unit position. In this case, the discrepancy in the first direction is presented independently of the discrepancy in the second direction.

In connection with the present invention, the presentation of the spatial discrepancy in the first direction by the first discrepancy indicator can be regarded such that the interval from the target position to the plane is indicated thereby only with accuracy for this first direction, i.e. the discrepancy indicator represents a range in only this direction, the interval corresponding to the shortest connection between the plane and the target position. A similar situation applies to the presentation of the interval in the second direction, at right angles to the first direction, wherein the second discrepancy indicator means that the interval in this case is likewise intended to be understood as represented only in this second direction (specifically exclusively in this second direction). The indicators therefore relate to the actually present (absolute) interval in just one of the defined directions in each case.

For this, the presentation of the discrepancy indicator is preferably based on an appropriate function, the latter being embodied such that, for the respective indication of the interval for the first direction, the execution of the function involves only the interval component for this first direction (shortest range between the target position and the plane defined by the surveying appliance and the marking unit) being used and the interval being indicated on the basis only of this component for just this first direction. Thus, the function processes only the X component of an interval, for example, and the interval ascertained in this manner is indicated or symbolized (only) in the X direction by means of the discrepancy indicator. For the presentation of the interval in a Y direction, similarly only the Y component of the interval is processed and the interval in the Y direction indicated.

According to the invention, it is therefore possible to determine the position of the marking unit from interaction of the marking unit, for example a surveying rod with a reflector, and a surveying appliance, e.g. a total station, particularly by targeting the reflector with laser radiation that is emitted by the targeting unit of the surveying appliance. In this case, a distance measurement can be taken on the basis of the principle of propagation time measurement or phase measurement, particularly using propagation time difference and/or phase difference. The angle measurement is performed by means of appropriate angle measurement sensors. A data memory in the surveying system stores target information, particularly coordinates of targets that need to be marked. Taking account of the marking unit position and the target positions, it is possible for these positions to be compared, with marking of the target essentially requiring the establishment of a position match between marking unit position and the position of the next target to be marked. To this end, the mobile marking unit needs to be moved closer to the target position until this position or a tolerance range defined around the target position has been reached.

For the purpose of establishing the marking unit position on an ongoing basis, the surveying appliance can have an automatic target tracking function for prisms serving as a target reflector, e.g. on surveying rods (ATR: "Automatic Target Recognition"). For this, a separate ATR light source—e.g. a multimode fiber output that emits visual radiation with a wavelength in the region of 850 nm—and a special ATR detector (e.g. CCD area sensor) that is sensitive to this wavelength may additionally be integrated in the targeting unit.

As part of the ATR fine targeting function, this involves an ATR measurement beam being emitted in the direction of the targeting direction, said ATR measurement beam being retro-reflected by the prism, and the reflected beam being captured by the ATR sensor. Depending on the discrepancy in the orientation of the targeting direction from the prism, the impingement position for the reflected radiation on the ATR sensor also differs from a central sensor area position (i.e. the reflection spot from the ATR measurement beam retro-reflected by the prism on the ATR area sensor is not situated in the center of the ATR area sensor and therefore does not impinge at a setpoint position that has been stipulated by means of calibration, for example, as that position corresponding to the optical target axis).

If this is the case, it is possible for the orientation of the sighting device to be slightly readjusted by motor such that the ATR measurement beam retro-reflected by the prism impinges on the ATR area sensor with high precision in the center of the sensor area (i.e. the horizontal and vertical angles of the sighting device are iteratively changed and adjusted until the center of the reflection spot coincides with the setpoint position on the ATR area sensor). Alternatively, a residual discrepancy between the impingement point of the retro-reflected ATR measurement beam on the ATR area sensor and the center of the sensor area can also be taken into account in calculations and converted into an angle that is added as appropriate to the spatial angle—captured using the angle sensors—at which a target axis of the targeting unit points. That is to say that the spatial angle to one targeting point can in this case also be derived from the spatial angle—captured using the angle sensors—of the target axis and a store for the detected ATR measurement beam reflection from the sensor center (i.e. from that central point on the ATR sensor at which the target axis is depicted). This allows a significant increase in the attainable accuracy for the orientation of the targeting direction onto a prism in comparison with manually effected targeting with a reticle and on the basis of mere judgment by eye.

In addition, the camera of the surveying appliance is used to capture a camera image, this image being captured essentially in the targeting direction and hence usually in the direction of the surveying rod, since the targeting unit is oriented to the reflector on the surveying rod in order to determine the position of the marking unit. For this, the camera is oriented essentially in the targeting direction, i.e. the camera is oriented such that an image can be captured such that an object targeted with the targeting unit can be captured in the image. In particular, a capture direction for the camera is for this purpose oriented coaxially or with a slight offset parallel to the targeting direction. The direction of image capture can likewise be determined using the angle measurement sensors. In the captured image of the terrain in the direction of the marking unit, the positions of possible targets—if the points are situated in the visual range of the camera—and of the marking unit position can now be referenced or the coordinates thereof can be transformed such that they can be presented in the camera image with correct positioning. The camera image is presented on an output unit, for example a display, particularly a touch-sensitive display, wherein the output unit may be arranged in the surveying appliance or in a remote control for the system, for example.

When the presentation functionality is executed—by the surveying system—graphical objects (discrepancy indicators) are produced in the camera image or on the output unit and are used for indicating a range between marking unit position and target position. In this case, the objects respectively indicate the range in a defined direction to the target. This presentation can be provided by means of bars or by means of adjacent segments, for example, the shape and/or color of which can be adjusted depending on the range. By way of example, the discrepancy indicators can be colored in a similar manner to the signal colors on a set of traffic lights—red, yellow, green—, with red being able to represent a large interval and green being able to represent a short interval between marking unit position and target position. In particular, the length of a bar or the number of shining segments or virtual LEDs can represent the distance between the positions, with a relatively short bar being able to represent a shorter distance or many lit segments being able to represent a longer distance. The length of the bar can therefore represent a distance that is indicated by a distance value. This ratio of bar length—or of the design of the discrepancy indicator in general—to distance value can be altered, in particular automatically, on the basis of the established distance, and the discrepancy indicator can therefore be rescaled.

The spatial discrepancy between the marking unit position and the target position is indicated in a first direction by an interval from the target to a connecting line between surveying appliance and marking unit. The respective position of the surveying appliance and the marking unit defines a first plane from which this interval is determined. In the second direction, particularly a direction perpendicular to the first, the interval that exists between the target position and a normal or between a vertical second plane and the first plane is also indicated.

In particular, the invention provides for a scaling for the presentation of the first and second discrepancy indicators to be able to be changed over between at least two scalings in each case, in particular independently of one another. Such a scaling option can be used to achieve significantly increased user-friendliness for the surveying system. Depending on the interval between the marking unit and the next target, it is possible to set a sensitivity for the discrepancy indicator such that a relatively short or possibly longer approach or a range of the marking unit from the target position can be read off from an alteration in the indicator as required.

In addition, the invention can provide for the scaling to be manually or automatically adjustable on the basis of the spatial discrepancy. Thus, a user of the surveying system who is at a range of approximately 100 meters with the surveying rod in a direction (x or y direction) from the target, for example when selecting a desired scaling, can change from sensitive scale regions, e.g. from a region whose maximum range representation reflects a distance of 0.1 meter, to coarser scalings until a range of 100 meters is no longer indicated by a maximum deflection of an indicator bar. Furthermore, the scaling can be automatically converted by the system, so that it is adjusted for optimum distance indication continually or in steps. In particular, the scaling can be set on the basis of a distance between the target position and the marking unit position relative to a distance threshold value defined on the basis of the target position and/or on the basis of a classification of the distance into defined range zones around the target position, in particular wherein the spatial discrepancy can be taken as a basis for automatically providing a scaling recommendation. Hence, decision criteria may be defined, on the basis of which changeover between different scalings can take place. By way of example, automatic rescaling of the first and/or the second discrepancy indicator can take place when a boundary line that represents the threshold value and that is defined—in particular circularly—around the target is not reached, with a next more sensitive region in an adjacent order of magnitude being set, for example. Furthermore, when one range zone is left and another zone is entered with the marking unit, it is likewise possible for the scaling to be changed over manually or automatically. For the manual changeover, it is possible for particularly the surveyor using the system to have a piece of information or a recommendation visually or audibly indicated to him to change to a scale region that provides a better suited presentation of the range.

Stages may be provided for the different scalings, with a change in the scaling possibly being linked to a change in the region of the order of magnitude of the scaling. If the scaling changes to the next finest scaling stage in this case, a ten-fold finer division of the presentation of the discrepancy indicator and a maximum usefully indicatable range value reduced by the factor 10 may be set. According to the invention, the scaling may thus be adjustable in at least three orders of magnitude, in particular wherein maximum spatial discrepancies in orders of magnitude from $10^{-3}$ meters to $10^{+3}$ meters are adjustable for the first and/or the second discrepancy indicator. These indication options can be used to select quickly between desired or required sensitivities, in particular manually.

According to the invention, the scaling for the first discrepancy indicator and for the second discrepancy indicator may be adjustable collectively or separately. Separate scaling affords the further advantage of the invention that the user can, for example in a first step, make as good an approach as possible in the first of the two indicated directions and at the same time the scaling for the second direction continues to have such coarseness that alterations in the range continue to be able to be presented in suitable fashion even when the range to the target is long relative to the first direction. In addition, it is thus possible for range zones—e.g. in order to define automatic changeover for scalings—around the target to be defined that, by way of example, can be dimensioned differently in the first direction in comparison with the second direction, for example elliptically or rectangularly, and hence can be adjusted to particular terrain circumstances or different ranges in both directions, for example.

At least one of the discrepancy indicators may, on the basis of one specific embodiment of the invention, be embodied by a symbolism for presenting the respective interval in the respective direction, so that the interval to be indicated can be graphically symbolized by the symbolism in the respective direction. By way of example, such symbolism may be embodied by a graphical representation of the interval. In addition, different range regions may be defined for the presentation of the symbolism, with an appropriate symbolism being displayed or said symbolism being updated on the basis of the current range to the target. The symbolism may therefore also be of scalable design, i.e. within the different scales an identical symbolism or an identical symbol may respectively represent different ranges (that is to say so that, depending on the currently used scale that covers an appropriate range region in each case, a specific symbolism indicates a range that is within the range region covered by the respective scale).

In particular, according to the invention, at least one discrepancy indicator may be in the form of a bar, in particular of segmented bars, and/or at least one discrepancy indicator may have symbols, wherein a reference symbol indicates the target position and a position symbol indicates the marking unit position, and/or at least one discrepancy indicator may have a color characteristic (i.e. the display may be presented or stored in color depending on the range to be indicated between marking unit position and target position) and/or at least one discrepancy indicator may be embodied by virtual light-emitting diodes. The design of the first and/or the second discrepancy indicator may be defined as part of the invention such that a basic shape retention for the discrepancy indicator or the presentation of the distance discrepancy means that an alteration in the distance, e.g. an increase or decrease in the range to the target in the respective direction, is evident from an indicator change within the framework of the retained shape. By way of example, a frame may thus be presented in the form of a bar, the fill level of which indicates a distance and the orientation of which on the output unit indicates the direction of the distance. In this case, a match between marking unit position and target position may be represented in the center of the bar shape, for example, and a discrepancy therefrom can be indicated by a deflection of the bar in a direction on the basis of a relative position of the target in relation to the marking unit. By way of example, the bar may be presented essentially horizontally on a display, with a relative location for the target in relation to the surveying rod (on the basis of the connecting line between surveying appliance and surveying rod) being displayed to the right of the connecting line with a deflection of the filling of the bar to the right and the range in this direction (to the right) being indicated by the fill level of the bar (and of the scaling thereof). Furthermore, the match between marking unit position and target position may be indicated at one end of the bar and hence a representation of the distance in one direction may be indicated by the filling of the bar. If the location of the target changes in this case, e.g. to the other side of the connecting line or to the other side of a normal to the connecting line, the match between marking unit position and target position may be indicated at the opposite end of the bar. In addition, the bar may be divided into individual sections and/or the indication may be provided by means of adjacent virtual LEDs.

Depending on the interval between marking unit position and target, it is therefore possible to indicate ranges by means of lighting up, particularly in different colors, e.g. long distances can be indicated by red lighting and short distances can be indicated by green lighting. In addition to this color-coded indication, it is also possible for the respective number of lit segments or LEDs to indicate a distance. In this case, a direction associated with the distance can be expressed by the arrangement of the individual segments or light-emitting diodes, e.g. linearly next to one another.

Within the framework of the invention, it is also possible for the first and/or the second discrepancy indicator to be updated independently of the camera image, in particular independently of a magnification factor and/or a displayed image detail from the camera image. Furthermore, at least one discrepancy indicator, in particular a color and/or dimensional design of the discrepancy indicator, can be updated on the basis of the distance between the target position and the marking unit position. The camera-image-independent updating of the indicator means that the user can zoom into the image captured using the camera of the surveying appliance, for example, or can select and display image details and at the same time simultaneously have the discrepancy between the current marking unit position and the target position presented. For the position discrepancy, the indication of the real distance and direction to the target can be retained in this case, even though the camera image presented on the output unit affords a detail perspective, for example, in which the marking unit is not shown and/or the presentation thereof might lead to the supposition of a much shorter or longer distance.

In addition, the invention may provide for the database to store a digital terrain model and for the target position and also particularly a map view to be derivable from the terrain model. The targets to be marked can accordingly be defined using a CAD model of a terrain, for example, in which targets can be defined by coordinates or from which already stored targets can be used for marking. On the basis of this model, it is additionally possible to generate a map view of the terrain, particularly with consideration of target positions, which provides a top view of the measurement environment. By using the terrain model, the user of the surveying system can be provided with further assistance for performing a marking process. In addition, the targets can therefore be defined and stored in the system before the start of measurement on a computer workstation, e.g. in the office of the surveyor, by means of the orientation on the terrain model or by means of the coordinate system of the model.

In particular, the invention may provide for the surveying system to have a remote control for remotely controlling the surveying system. Hence, by way of example, a measurement or marking process can be controlled remotely, i.e. not by means of direct input of control commands on the surveying appliance. The remote control can thus be used to input further targets to be marked, for example. In addition, the remote control may incorporate a display on which both the camera image and targets—provided that these are in the field of vision of the camera—can be presented. In contrast to known two-person surveying, wherein one surveyor carries the surveying rod and a second surveyor provides the first with direction and range details in order to guide him to the next target, this embodiment allows the marking of the targets to be carried out by one user alone, said user carrying the surveying rod and having the remote control available.

The invention relates furthermore to a geodetic surveying appliance, particularly a total station or theodolite, for the inventive surveying system. In this case, the appliance can be used firstly to determine the position of the marking unit and secondly to render the camera image that is used to guide a surveyor capturable and providable. The surveying appliance has a targeting unit that defines a targeting direction, particularly a telescope, an angle measuring functionality, particularly for capturing the orientation of the targeting unit, and a camera for capturing a camera image. In addition, the appliance has a target position-stored in a database—for a target, an output unit, particularly a display, on which the camera image can be presented, and has a control and processing unit. In addition, the surveying appliance has a presentation functionality that, when the presentation functionality is executed under the control of the control and processing unit, involves a spatial discrepancy between a marking unit position for a mobile marking unit and the target position being graphically presented on the output unit. In this case, the discrepancy is presented in a first direction by means of a first discrepancy indicator, wherein the first discrepancy indicator indicates an interval from the target position to a plane defined by the surveying appliance and the marking unit, and in a second direction by means of a second discrepancy indicator, wherein the second discrepancy indicator indicates an interval from the target position to a normal to the plane, which normal is stipulated by the marking unit position. In this case, the discrepancy in the first direction is presented independently of the discrepancy in the second direction.

The discrepancy indicators presented by the output unit are used to indicate a range between marking unit position and target position. In this case, the indicators each indicate the distance in a defined direction to the target. The distance is presented by means of the embodiment of the discrepancy indicators, this being able to be updated continually according to the ascertained position difference. In addition, the shape of the discrepancy indicator can indicate a defined direction to the marking unit position, which direction is associated with the distance.

In particular, a scaling for the presentation of the first and second discrepancy indicators may be able to be changed over between at least two scalings in each case, in particular independently of one another. Hence, depending on the interval between the marking unit position and the target position, a sensitivity for the indicator can be set such that the indication of the current interval lies in an indicator region for the discrepancy indicator and an alteration in the interval, particularly by movement of the marking unit to and fro relative to the target, is distinctly perceptible on the indicator.

A further aspect of the invention relates to a geodetic marking method for marking a target that is known in a coordinate system, having an inventive surveying system. As part of the marking method, a marking unit position for a mobile marking unit is determined, a camera image is captured using a camera of a surveying appliance, and the camera image is presented on an output unit, in particular together with the marking unit position and/or the target position. In addition, a spatial discrepancy between the marking unit position and the target position is graphically presented on the output unit. The discrepancy is presented in a first direction by means of a first discrepancy indicator, wherein the first discrepancy indicator indicates an interval from the target position to a plane defined by the surveying appliance and the marking unit, and in a second direction by means of a second discrepancy indicator, wherein the second discrepancy indicator indicates an interval from the target position to a normal to the plane, which normal is stipulated by the marking unit position. In this case, the discrepancy in the first direction is presented independently of the discrepancy in the second direction.

In particular, the invention may provide for the marking method to involve scaling for the presentation of the first and second discrepancy indicators being effected in each case in one of at least two scalings, in particular independently of one another.

In addition, the scaling can be effected manually or automatically on the basis of the spatial discrepancy, in particular on the basis of a distance between the target position and the marking unit position relative to a distance threshold value that is defined on the basis of the target position and/or on the basis of a classification of the distance into defined range zones around the target position, in particular wherein the spatial discrepancy can be taken as a basis for automatically providing a scaling recommendation.

In addition, the invention may provide for the marking method to involve at least one discrepancy indicator being in the form of a bar, in particular of segmented bars, and/or at least one discrepancy indicator having symbols, wherein a reference symbol indicates the target position and a position symbol indicates the marking unit position, and/or at least one discrepancy indicator possibly having a color characteristic (i.e. the indicator may be presented or stored in color depending on the range to be indicated between marking unit position and target position), and/or at least one discrepancy indicator possibly being embodied by virtual light-emitting diodes.

The invention relates furthermore to a computer program product having program code, which is stored on a machine-readable storage medium, for carrying out an inventive marking method for marking a target, particularly when the program is executed on an electronic data processing unit in the form of a control and processing unit for an inventive surveying system. A user of a surveying system can be provided with different presentations of a terrain within the framework of a marking process. Depending on the distance between the marking unit position and the target position, it is possible, for example when the distance is relatively long, for a synthetically produced top view of the measurement terrain (map view), particularly with a marking for the position of the marking unit and markings for the targets that are to be marked or have already been marked, to provide an advantageous presentation. If the marking unit is positioned relatively close to the target, on the other hand, the camera image of the map view can be preferred for a precise approach.

An inventive surveying system for marking a target that is known in a coordinate system has a mobile marking unit and a geodetic surveying appliance, in particular for determining the position of the marking unit. The marking unit is designed such that a marking unit position for the marking unit can be determined with high precision, in particular wherein the marking unit has a customizable reflector and/or a GNSS antenna for determining the marking unit position, and the surveying appliance has at least one targeting unit that defines a targeting direction, particularly a telescope, an angle measuring functionality and a camera for capturing a camera image. In addition, the system has a database that stores a target position for a target and a map view of a terrain that has the target, an output unit, particularly a display, on which the camera image and/or the map view can be presented, particularly in a top view, and a control and processing unit. In addition, the surveying system provides an indicator functionality having an automatic changeover function that, when the indicator functionality is executed under the control of the control and processing unit, involves meeting of a defined indicator criterion being taken as a basis, in particular a position ratio between the target position and the marking unit position being taken as a basis, for displaying the camera image or the map view on an output unit. In addition, changeover between the camera image and the map view is effected automatically, in particular by taking account of a distance and/or angle threshold value, in particular wherein the camera image and/or the map view are displayed together with the marking unit position and/or the target position.

An inventive geodetic surveying appliance, particularly a total station or theodolite, for an inventive surveying system has a targeting unit that defines a targeting direction, particularly a telescope, an angle measuring functionality, particularly for capturing the orientation of the targeting unit, and a camera for capturing a camera image. In addition, the appliance has a database that stores a target position for a target and a map view of a terrain that has the target, an output unit, particularly a display, on which the camera image and/or the map view can be presented, and a control and processing unit. In addition, an indicator functionality having an automatic changeover function is provided that, when the changeover functionality is executed under the control of the control and processing unit, involves meeting of a defined indicator criterion being taken as a basis, in particular a position ratio between the target position and a marking unit position for a marking unit being taken as a basis, for displaying the camera image or the map view on an output unit, and changeover between the camera image and the map view being effected automatically, in particular by taking account of a distance and/or angle threshold value, in particular wherein the camera image and/or the map view are displayed together with the marking unit position and/or the target position.

In addition, an inventive geodetic marking method for marking a target that is known in a coordinate system, with an inventive surveying system, involves determination of a marking unit position for a mobile marking unit, capture of a camera image using a camera of a surveying appliance and production of a map view, particularly a top in plan view, in particular wherein the marking unit position, the target position and a position for the surveying appliance are represented in the map view. In addition, meeting of a defined indicator criterion is taken as a basis, in particular a position ratio between the target position and the marking unit position is taken as a basis, for displaying the camera image or the map view on an output unit, and changeover between the camera image and the map view is effected automatically, in particular by taking account of a distance and/or angle threshold value, in particular wherein the camera image and/or the map view are displayed together with the marking unit position and/or the target position.

In particular, the invention may involve a piece of information that represents an interval and/or a direction from the marking unit position to the target position, particularly an arrow and/or concentric circles, being displayed in the camera image and/or the map view.

Hence, by way of example, a surveyor can be provided with an opportunity to automatically have a view of the measurement terrain displayed that can afford an optimized overview in respect of the orientation, particularly in the direction of the next target to be marked. If the surveyor with the marking unit is a long way away from the target, then the map view can be used to provide an overview of the current position and of targets that are to be marked or that have already been marked, which the surveyor can use to derive a coarse direction and a coarse distance to the next target. In the case of an approach to the target that is such that although the map view still allows orientation, a faster and more accurate approach to the target can be provided by means of the camera image, the display on the output unit can automatically change over and the surveyor can be provided with a more detailed piece of surroundings information. In addition, in this camera image—in contrast to the map view—, it is possible for real height differences or obstacles in the terrain to be presented, for example, and hence be better assessed by the surveyor. Various decision criteria may be stored for the automated changeover between the views and are taken as a basis for setting one of the two views—either camera image or map view. By way of example, distance threshold values or angle threshold values relative to the next target may be defined for this, with changeover occurring when said values are undershot or exceeded.

In addition, the changeover to the map view can be effected if the distance between a prism, i.e. a prism that is arranged on a surveying rod as a retroreflector, and the target is very long or if the target is not situated close to the line of vision of the surveying appliance (relatively large angle between line of vision and target). In addition, the map view can be displayed if a target can be displayed in the camera image captured by the camera, in particular wherein the camera image is updated continually, in particular wherein the camera captures a realtime video. Furthermore, the output unit can be used to display an information indicator if the marking unit is positioned very close to the target, in particular if a defined minimum interval to the target is reached. The information indicator can be used to provide the surveyor with control options that can be used to prompt storage of the target position, for example.

The map view can be displayed particularly for the purpose of presenting an overview of the marking situation, for the purpose of selecting targets or for quality control purposes, i.e. which targets are already marked and which targets still need to be marked. By contrast, the camera image can provide a realtime view of the marking situation, can be used to indicate whether a line of sight to a selected target is free, i.e. not shaded or interrupted by obstacles, or can be used to guide the surveyor to the target.

In addition, markings that are presented in the respective view, e.g. circles around the target, can provide information about the range of the marking unit from the next target.

Furthermore, further indication options may be available to assist guidance. By way of example, the background of the camera image can be presented in faded form, i.e. for example in increased brightness, on the basis of the interval between target and marking unit, with a degree of fading being able to decrease as the marking unit approaches the target and to increase as it moves away from the target.

In addition, the map view can be displayed on a color background on the basis of the distance between target and marking unit. The distance can therefore be represented in color-coded form, for example with a red background color for long distances and a green color for short distances. When the map view is presented, this coding can provide a decision basis for changing over to the camera image, for example. Thus, the green background color can indicate ranges at which both the marking unit position and the target can be displayed in the camera image. Hence, a changeover recommendation, particularly for a user, can be provided for the purpose of changing over to the presentation of the camera image.

BRIEF DESCRIPTION OF THE DRAWINGS

The inventive surveying system, the inventive surveying appliance and the inventive marking method are described in more detail below purely by way of example with reference to specific exemplary embodiments that are shown schematically in the drawings, with further advantages of the invention also being discussed. Specifically:

FIG. 1 shows a schematic illustration of an arrangement of targets, of a surveying appliance and of a marking unit;

FIGS. 2a-b show an output unit for an inventive surveying system with a camera image and with a first embodiment of an inventive discrepancy indicator in two directions and an overview illustration, projected into one plane, with a symbolized surveying appliance, marking unit position and target;

DETAILED DESCRIPTION

Figure 3A:
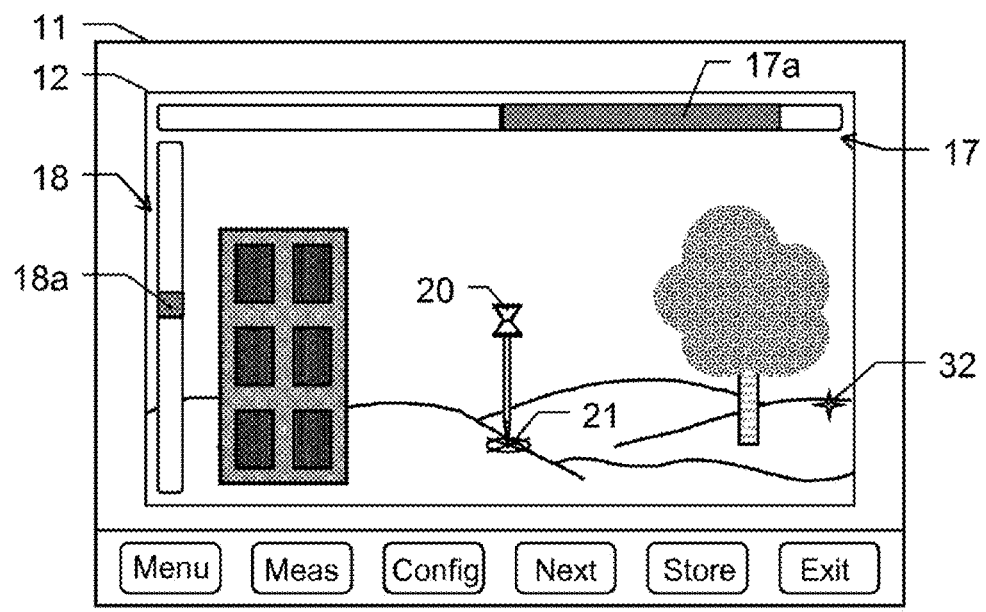
FIGS. 3a-c show a second embodiment of the inventive discrepancy indicator of the inventive surveying system, an overview illustration that clarifies the marking situation and an alternative scaling for the indicator.

FIG. 1 shows a schematic illustration of an arrangement of targets 30a, 30b, 35a, 35b, a position for a surveying appliance 10 and a marking unit position 21 for a marking unit. The illustration shows said elements represented by symbols when projected into a plane. In addition, a connecting line 41 between the surveying appliance and the marking unit is shown, this line 41 indicating a plane defined by the position of the surveying appliance 10 and the marking unit position 21. The connecting line 41 has a normal 42 running perpendicular to it, the position of which is defined by the marking unit position 21. In addition, the targets 35a, 35b have already been marked and stored in the surveying system as such in the course of a marking process. Therefore, these points 35a, 35b are denoted by alternative symbols.

For the purpose of marking the two remaining targets 30a, 30b, the marking unit (surveying rod) needs to have its lower, in particular tapered, end successively positioned at the points 30a, 30b. To this end, the surveying rod is carried and placed by a user of the surveying system. Starting from a current position of the marking unit 21, the user therefore needs to overcome a position difference 50 between marking unit position 21 and target position in order to reach the next target (in this case: target 30*b*).

This position difference 50 can be broken down into, according to the invention, at least two components in a respective defined direction. In this case, an interval 51 for the target 30*b* from the connecting line 41 or from the plane can indicate a distance to the target 30*b* (starting from the marking unit) in a first direction, and a distance 52 for the target 30*b* from the normal 42 to the connecting line 41 can indicate a distance to the target 30*b* in a second direction. By way of example, the directions for which the respective distances are indicated can be referred to as the x direction and the y direction, particularly in an internal coordinate system.

FIG. 2*a* shows an output unit 11 for an inventive surveying system with a camera image 12 and with two discrepancy indicators 15, 16 in two independent directions. In this case, the camera image 12 is captured and continually updated by means of a camera provided on a surveying appliance 10. The camera or the targeting unit of the surveying appliance, with which targeting unit the camera is associated, is in this case oriented to a reflector of a marking unit 20 for the purpose of continual position determination. A first end of the marking unit 20, particularly a lower, tapered end, defines a marking unit position 21 in this case. Furthermore, a target 31 is situated in the field of vision of the camera and can therefore likewise be presented on the camera image 12. Between the target 31 to be marked and the marking unit position 21 there is a position difference that, for the purpose of marking the target 31, needs to be overcome or to be reduced in such a way that the point 31 can be marked within a predefined tolerance range. To clarify the position circumstances, FIG. 2*b* shows an overview illustration with a symbolized surveying appliance 10, marking unit position 21 and target 31, with the marking situation projected into a plane as shown in FIG. 2*a* being depicted. In this case, the position difference is indicated firstly in a first direction, in the x direction, by an interval 51 from the target 31 to a connecting line 41 between surveying appliance 10 and marking unit position 21. Secondly, the interval 52 between the target 31 and the normal 42 to the connecting line 41 indicates a position difference in a second direction, the y direction. A user of the inventive surveying appliance accordingly needs to overcome the interval 51 in the x direction and the interval 52 in the y direction with the surveying rod 20 in order to achieve a match between target position and marking unit position 21.

For this, the discrepancy indicators 15, 16 are displayed in the camera image 12 of the output unit 11. In the present embodiment, these consist of virtual light-emitting diodes. By way of example, the discrepancy indicator 15 has light-emitting diodes 15*a-g*, with a number of diodes 15*a-g* lighting up depending on the distance and direction between target 31 and marking unit 20. The indicator 15 indicates the position discrepancy in the x direction and the indicator 16 indicates the discrepancy in the y direction. The discrepancy indicator 15 lights the diodes 15*b*, 15*c*, 15*d*, and the LED 15*d* lighting on its own, for example in a green color, indicates that the target position has been reached. The lighting of the diodes 15*b*, 15*c* indicates that the target position is situated to the left in the x direction relative to the current marking unit position 21 (on the basis of the direction of view from the surveying appliance 10 toward the marking unit 20). Similarly, the indicator indicates that the target 31 is simultaneously downward in the y direction. The distance between the positions in the respective direction is indicated by color-coded lighting and/or by the lighting of a number of LEDs that represent the distance.

Figure 3B:
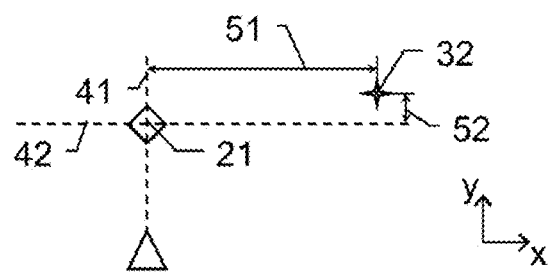
Figure 3C:
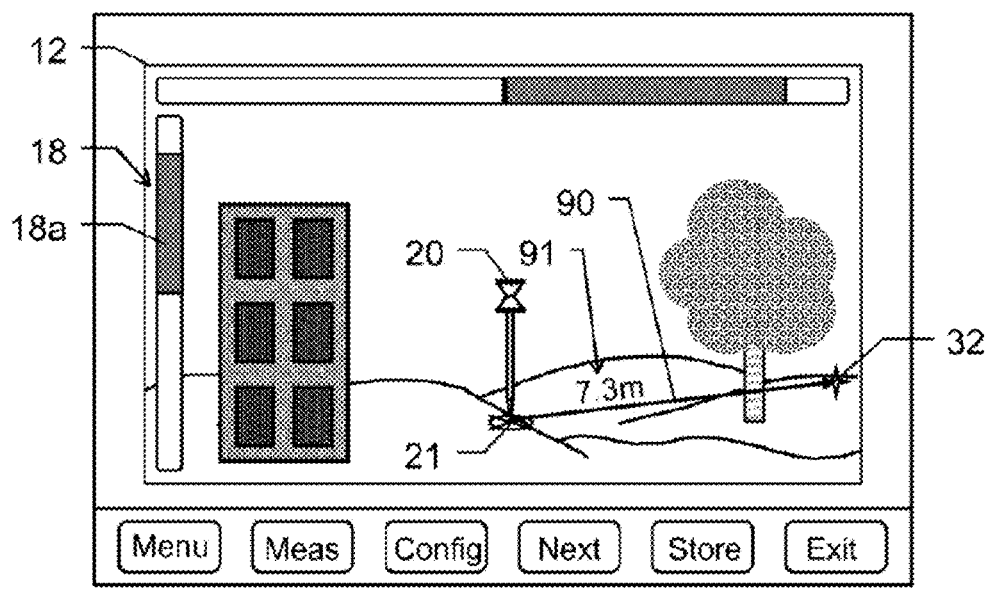

FIG. 3*a* shows a second embodiment of the inventive discrepancy indicator 17, 18 of the inventive surveying system. A camera image 12 on a display 11 of the surveying system has again captured and displayed a marking unit 20, defining a marking unit position 21, and a target 32. To clarify the position difference, FIG. 3*b* shows a two-dimensional overview illustration that clarifies the marking situation shown in FIG. 3*a*. According to the invention, this case indicates the intervals 51, 52 between the target 32 and the connecting line 41 and the normal 42 to the connecting line 42 in the x and y directions by means of two discrepancy indicators 17, 18 that are each in the form of a bar. In this case, each bar 17, 18 represents one of the directions (x or y direction) for the position difference between marking unit position 21 and target position. In this case, fillings 17*a*, 18*a* for the bars 17, 18 are used to indicate the respective distance in the respective direction. The filling level for the bars 17, 18 can be updated and corresponds with a continual comparison of target position and marking unit position 21, in particular wherein the filling level is updated essentially continuously. In addition, the scaling of the discrepancy indicators can be altered, with the scaling for the bar 17 being able to be set independently of the scaling of the bar 18. An altered scaling for a constant marking condition is shown in FIG. 3*c*. The ranges between the marking unit position 21 and the target 32 are in this case identical to those in FIG. 3*a*, but a different scaling has been chosen for indicating the position difference in the y direction. The filling 18*a* of the bar 18 has risen as a result of the scaling change, i.e. the scaling that is now chosen allows a distance change to be indicated more finely, or the scaling is set to a more sensitive level. Accordingly, this setting can be used to indicate changes in the distance more accurately, with a value for a maximum indicatable distance having been chosen to be smaller.

Furthermore, in FIG. 3*c*, the camera image 12 indicates an arrow 90 from the position of the marking unit 20 to the target 32, which indicates a distance and direction from the marking unit position 21 to the target 32. In this case, the distance is indicated by the length of the arrow 90 and is also provided with a distance value by means of a label 91 on the arrow 90.

Both the length and direction of the arrow 90 and the label 91 can be updated continually on the basis of the respective position difference.

Figure 4A:
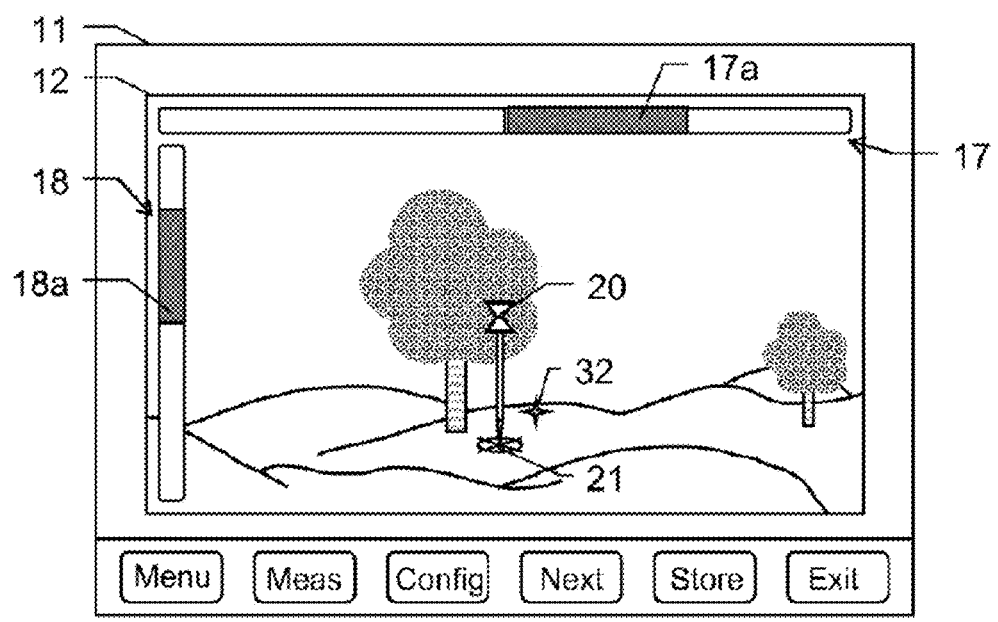
FIGS. 4a-b show the second embodiment of the inventive discrepancy indicator of the inventive surveying system with a further scaling for the indicator and an overview illustration that clarifies the marking situation.
Figure 4B:
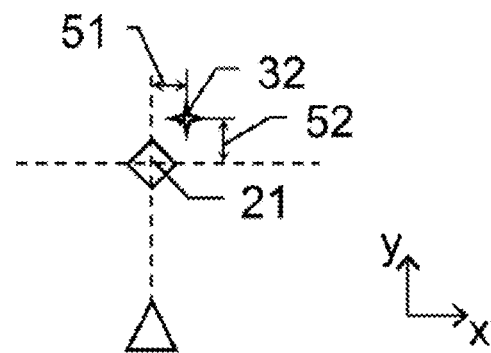

FIG. 4*a* shows the second embodiment of the inventive discrepancy indicator 17, 18 with an alternative scaling for the indicator, with FIG. 4*b* again showing an overview illustration that clarifies the marking situation. Furthermore, the target 32 shown in FIGS. 3*a*, 3*b* is shown, with the marking unit 20 or the marking unit position 21 being at a shorter range from the target 32 or—when the range is broken down in the x and y directions—having a much shorter distance 51 in the x direction. The discrepancy indicator used are again the bars 17, 18 in the camera image 12 on the output unit 11. With the approach of the marking unit 20 to the target 32 that is presented here, the scaling of the discrepancy indicators 17, 18 has been adjusted such that an approach or a range from the target 32 can be clarified by means of a change in the filling level for the bars 17, 18 even at the short distances 51, 52 now present that need to be indicated in a suitable manner. The scaling of the bar 17 has been sensitized such that a maximum filling 17*a* for the bar 17 now represents a smaller discrepancy between the actual position (marking unit 20) and the setpoint position (target 32) in comparison with the measurement situation shown in FIGS. 3a, 3b. In addition, the scaling of the bar 18 has been altered without a large change of distance having been achieved for the y direction. In this case too, a more sensitive setting is provided for reasons of user-friendliness so that, even in the case of small alterations in the position discrepancy in this direction, an alteration in the filling 18a of the bar 18 becomes recognizable.

Figure 5A:
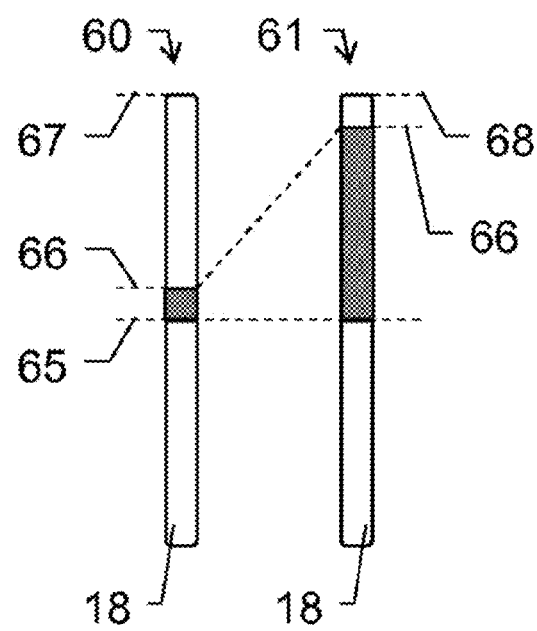
FIGS. 5a-b show inventive changeover of the scaling of the discrepancy indicator.
Figure 5B:
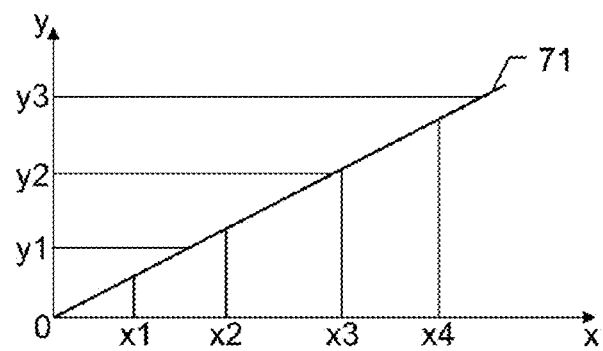

FIGS. 5a, 5b show inventive changeover of the scaling of the discrepancy indicator of the inventive surveying system. FIG. 5a shows two different scalings 60, 61 for a discrepancy indicator in the form of a bar 18. A first position 65 on the bar 65 represents a distance of "zero" between marking unit position and target position in this case, i.e. marking unit position and target position match. The filling level of the bar 18 in the position 66 represents the current distance between the points, with a relatively small region of the bar being filled for the scaling 60 and this filling region being large relative thereto for scaling 61. These different indicators result from the respectively chosen maximum representable distances for the respective scaling 60, 61. Therefore, a higher maximum displayable distance value is defined for the scaling 60 than for scaling 61. Filling of the bar 18 up to one end, i.e. up to position 67 or 68, would mean that the distance between the marking unit position and target position has at least the respective defined maximum value. So as thus to make position alterations for the marking unit more clearly recognizable, the scaling 61 provides a suitable, more sensitive setting.

Changeover between different scalings can be described by means of FIG. 5b. In this case, the x and y axes respectively represent an interval between the marking unit position and the target position in the respective direction. In addition, each discrepancy direction has distance values x1, x2, x3, x4, y1, y2, y3 defined for it, which in turn define suitable scaling regions for the discrepancy indicator. The curve 71 shows an interval profile for the marking unit position approaching and moving away on a direct path to and from the target position. If, when approaching, a distance in the x direction with the value x3 is not reached, for example, the discrepancy indicator can automatically change over from a scaling region that has to date depicted distances at least between the values x3 and x4 to the next more sensitive scaling region with distances to be depicted between x2 and x3. In particular, changeover to a more sensitive or coarser region can be effected even before a distance value that can still be depicted has been reached so that a representation of the distance does not change abruptly from a minimum value to a maximum value (or vice versa).

Figure 6:
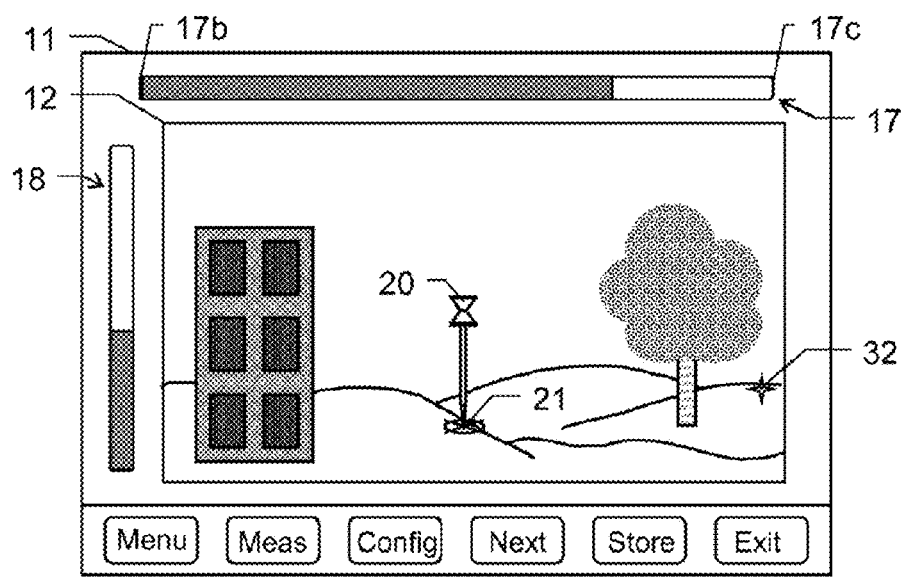
FIG. 6 shows a further embodiment of an inventive discrepancy indicator of the inventive surveying system.

FIG. 6 shows a further embodiment of the inventive discrepancy indicator 17, 18 of the inventive surveying system. A camera image 12 has captured a marking unit 20, and the associated marking unit position 21 and a target position 32 are presented. The camera image 12 is presented on an output unit 11, particularly on a display. In addition, the discrepancy indicators 17, 18 are displayed on the output unit 11 as bars. In this case, the bar 17 represents a discrepancy in the marking unit position 21 from the target position in an x direction (a discrepancy to the right as seen from the surveying appliance), with a first end 17b of the bar 17 (shown in this case: the left-hand end of the bar) being able to indicate a match between the positions. If the relative location of the target position with respect to the position of the marking unit alters such that a position discrepancy to the left needs to be presented, the second end 17c of the bar 17 would be able to present a position match, and a distance in the x direction to the left would be effected by a deflection of the bar 17 from a second end 17c in the direction of the first end 17b. The position discrepancy in a second direction, in the y direction, can be presented similarly by means of the bar 18.

Figure 7:
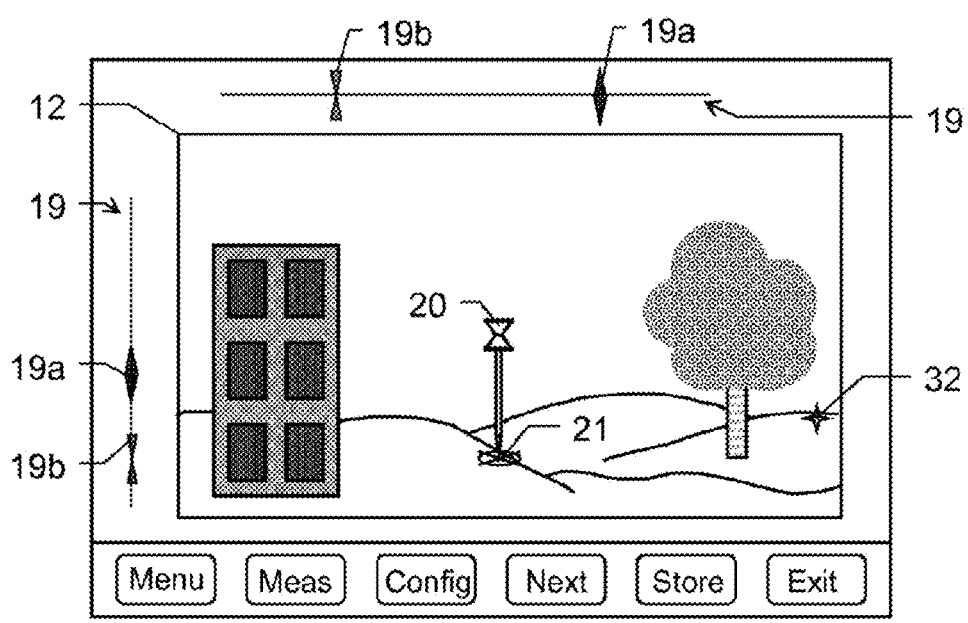
FIG. 7 shows a further embodiment of an inventive discrepancy indicator of the inventive surveying system.

FIG. 7 shows a further embodiment of the inventive discrepancy indicator 19 of the inventive surveying system. The camera image 12 has again captured a marking unit 20, and the associated marking unit position 21 and also a marking for a target 32 are presented. In this embodiment, the discrepancy indicator 19 is respectively embodied by symbols 19a, 19b, the symbol 19a being a respective reference symbol that represents the target position 32 (in the respective direction). In this connection, the symbol 19b is a position symbol that indicates the current marking unit position 21. Depending on the embodiment of the discrepancy indicator 19, the interval between the symbols 19a and 19b can be effected by a movement in both symbols 19a, 19b or by a change of position (on the display) for only the position symbol 19b or reference symbol 19a. If a surveyor with the marking unit 20 thus moves in the direction of the target 32, the presented interval between reference symbol 19a and position symbol 19b decreases (at least so long as a current scaling for the indicator is retained). If the marking unit position 21 and the target position are brought into line with one another, the symbols 19a, 19b overlap and therefore indicate to the user that the target 32 has been reached. In addition, numerical marking differences can be indicated in the camera image 12 and continually—on the basis of the relative positioning of the marking unit in relation to the target—updated.

Figure 8:
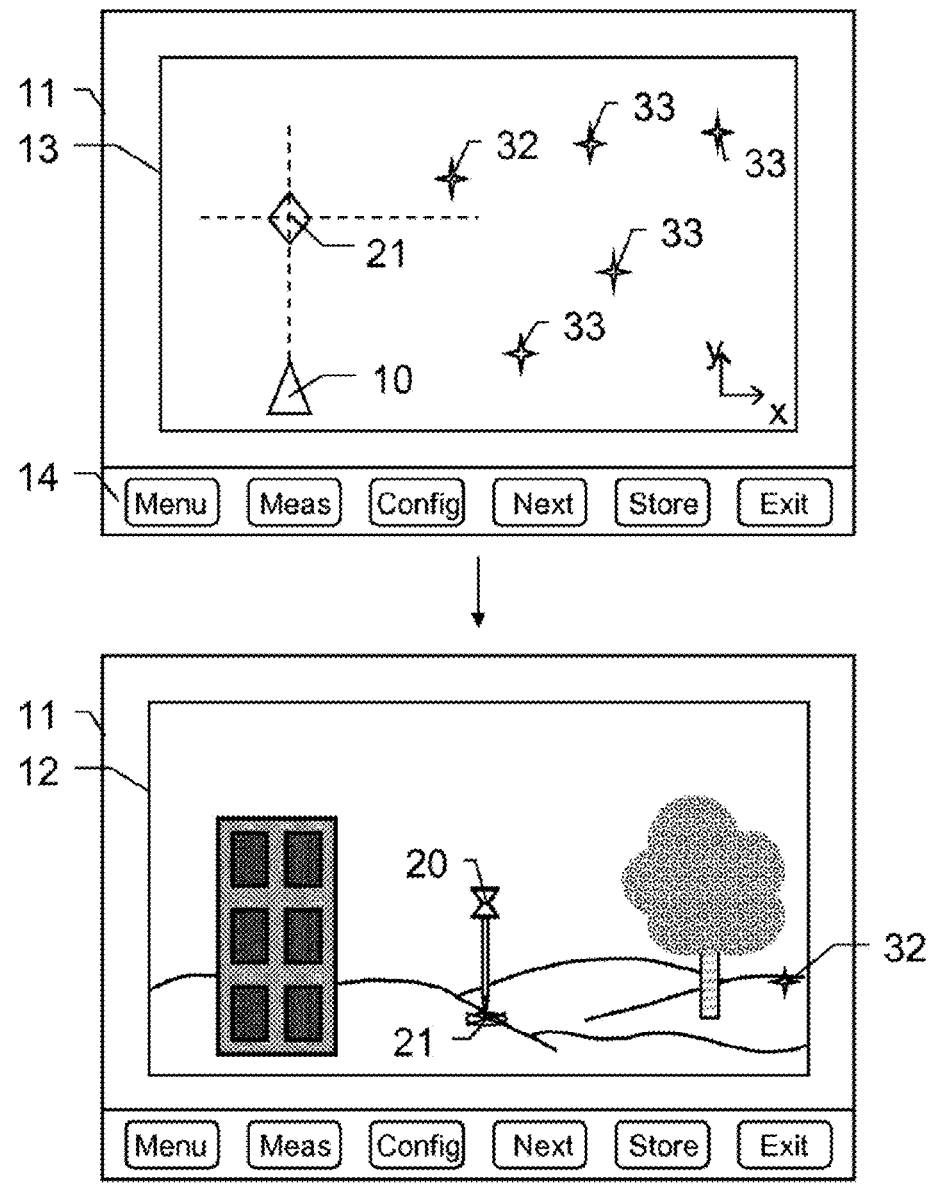
FIG. 8 shows inventive changeover between a camera image and a map view.

FIG. 8 shows inventive changeover from a map view 13 to a camera image 12 on an output unit 11 of an inventive surveying system. In the map view, the position of the surveying appliance 10 is presented, which surveying appliance determines the position of the marking unit 20, i.e. the marking unit position 21, and captures the camera image 12 using a camera. In addition, a next target 32, i.e. the target that is intended to be marked, and further targets 33 to be marked are indicated. The map view 13 can be used to effect orientation in terms of direction and distance to the next target 32 even when the target 32 is at such a range from the marking unit position 21 that it cannot be presented in a currently capturable camera image 12. Furthermore, this view provides a user of the system with an overview of which points 32, 33 still need to be marked and of the relative location of these points in relation to one another. A user interface 14 can be used to input control commands in order to select the next target 32 or to store a position for a target 32, 33, for example.

In the map view 13 displayed, a surveyor can accordingly approach the next target 32 coarsely with the surveying rod. In the embodiment shown, there is an automatic changeover to the presentation of the camera image 12 on the output unit 11 as soon as the next target 32 can be displayed in the camera image 12. Hence, the surveyor can be provided with a suitable view for assessing a position difference between the marking unit position 21 and the next target 32. In addition, the camera image 12 may reveal terrain circumstances, for example, that are not taken into account in the presentation of the schematic map view 13, particularly obstacles, depressions and/or elevations. When the camera image 12 is presented, the marking unit 20 can now be guided in the direction of the next target 32, with the surveyor being able to choose a path to the target 32 by taking into account the real terrain formation, for example.

Continual updating of the camera image 12, in particular, allows the surveyor to repeatedly match his movement to newly evident terrain circumstances.

In particular, the changeover can also be effected in the opposite direction from the camera image 12 to the map view 13.

Figure 9:
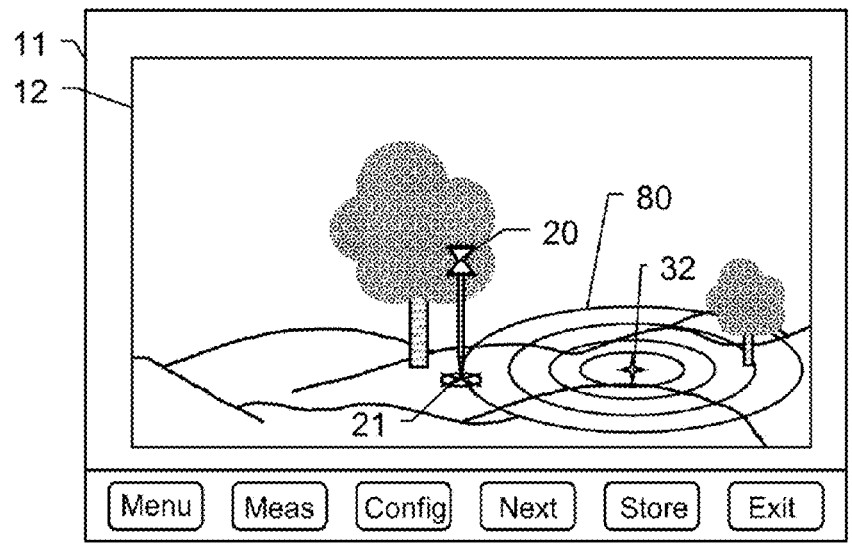
FIG. 9 shows a camera image from an inventive surveying system with an inventive orientation aid that represents direction and distance to a target, in a first embodiment.

FIG. 9 shows a camera image 12 on an output unit 11 of an inventive surveying system with a marking unit 20, which defines a marking unit position 21, and a next target 32. In addition, concentric circles 80 (shown in perspective) are displayed around the target 32, each circle 80 representing a defined interval from the target 32. In this case, the radius of the outermost circle 80 is chosen such that it intersects the marking unit position 21 and therefore provides a piece of information about the range at which the marking unit 20 is currently positioned from the target 32. For this, the circles 80 may each be labeled with a piece of information regarding their radius. A user of the surveying system can therefore be provided with a piece of information regarding the remaining distance to the target 32 and the direction by the circles 80. In addition, the radii and/or the number of the circles can decrease or increase on the basis of the interval between marking unit 20 and target 32.

Figure 10:
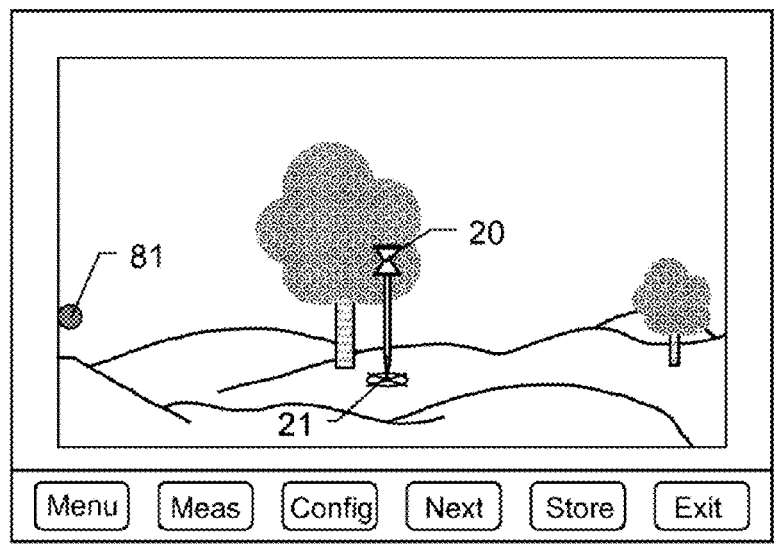
FIG. 10 shows a camera image from an inventive surveying system with an inventive indicator for indicating a location of a next target position.

FIG. 10 shows a camera image 12 from an inventive surveying system with an inventive indicator 81 for indicating a location for a next target position. The camera image 12 again shows the marking unit 20 with the marking unit position 21. In this case, the next target is situated outside the field of vision of the camera capturing the camera image 12. The image 12 in this case displays an indicator 81 that indicates a direction in which the next target is situated relative to the marking unit 20. In particular, the indicator 81 may be provided with a distance statement in order to additionally indicate the range to the target. By way of example, a color design of the indicator 81, by means of the size and/or by virtue of flashing, particularly at a variable frequency, can be used to represent the range to the target.

It is self-evident that these presented figures schematically illustrate only possible exemplary embodiments. According to the invention, the various approaches can likewise be combined with one another and also with methods and apparatuses for marking targets and with surveying appliances from the prior art.

What is claimed is:

1. A surveying system for marking a target that is known in a coordinate system, comprising:
   a mobile marking unit configured to precisely determine a marking unit position using a customizable reflector and/or a GNSS antenna;
   a geodetic surveying appliance for determining the position of the marking unit, the geodetic surveying appliance having access to data, stored in a database, representing a target position of the target, and the geodetic surveying appliance having:
      a telescopic targeting unit that defines a targeting direction, the telescopic targeting unit being swivelable about a vertical axis and a horizontal axis relative to a base of the geodetic surveying appliance;
      angle sensors configured for capturing the orientation of the telescopic targeting unit; and
      a camera configured for capturing a camera image essentially in the targeting direction;
   a display configured to display the camera image, together with the target position and/or the marking unit position;
   a control and processing unit; and
   presentation functionality that, when executed under the control of the control and processing unit, involves displaying on the display the camera image and a spatial discrepancy between the marking unit position and the target position, the spatial discrepancy being displayed:
      in a first direction using a first discrepancy indicator that indicates an interval from the target position to a plane defined by the surveying appliance and the marking unit; and
      in a second direction using a second discrepancy indicator that indicates an interval from the target position to a normal to the plane, which normal is stipulated by the marking unit position;
   wherein the spatial discrepancy is presented independently in the first direction and in the second direction.

2. The surveying system as claimed in claim 1, wherein:
   a scaling for presentation of the first and/or the second discrepancy indicator can be changed over in each case between at least two scalings.

3. The surveying system as claimed in claim 2, wherein:
   the scaling is manually or automatically adjustable on the basis of the spatial discrepancy.

4. The surveying system as claimed in claim 3, wherein:
   the scaling is manually or automatically adjustable on the basis of at least one of:
      a distance between the target position and the marking unit position relative to a distance threshold value defined on the basis of the target position; and
      a classification of the distance into defined range zones around the target position; and
   the spatial discrepancy is taken as a basis for automatically providing a scaling recommendation.

5. The surveying system as claimed in claim 2, wherein:
   the scaling is adjustable in at least three orders of magnitude; and
   maximum spatial discrepancies in orders of magnitude from $10^{-3}$ meters to $10^{+3}$ meters are adjustable for the first and/or the second discrepancy indicator.

6. A geodetic surveying appliance that has access to data, stored in a database, representing a target position of a target, the geodetic surveying appliance comprising:
   a telescopic targeting unit that defines a targeting direction, the telescopic targeting unit being swivelable about a vertical axis and a horizontal axis relative to a base of the geodetic surveying appliance;
   angle sensors configured for capturing the orientation of the telescopic targeting unit;
   a camera configured for capturing a camera image essentially in the targeting direction;
   a display configured to display the camera image;
   a control and processing unit; and
   presentation functionality that, when executed under the control of the control and processing unit, involves displaying on the display the camera image and a spatial discrepancy between a marking unit position and the target position, the spatial discrepancy being displayed:
      in a first direction using a first discrepancy indicator that indicates an interval from the target position to a plane defined by the surveying appliance and the marking unit; and
      in a second direction using a second discrepancy indicator that indicates an interval from the target position to a normal to the plane, which normal is stipulated by the marking unit position;

wherein the spatial discrepancy is presented independently in the first direction and in the second direction.

7. The geodetic surveying appliance as claimed in claim 6, wherein:
a scaling for the presentation of the first discrepancy indicator and the second discrepancy indicator can be changed over in each case between at least two scalings, independently of one another.

8. A geodetic marking method for marking a target that is known in a coordinate system, using the surveying system as claimed in claim 1, the method comprising:
determining a marking unit position for a mobile marking unit;
capturing a camera image using a camera of a surveying appliance, and
presenting the camera image on display, together with the marking unit position and/or the target position, wherein:
a spatial discrepancy between the marking unit position and the target position is graphically presented on the display:
in a first direction using a first discrepancy indicator that indicates an interval from the target position to a plane defined by the surveying appliance and the marking unit; and
in a second direction using a second discrepancy indicator that indicates an interval from the target position to a normal to the plane, which normal is stipulated by the marking unit position; and
wherein the discrepancy in the first direction is presented independently of the discrepancy in the second direction.

9. The geodetic marking method as claimed in claim 8, wherein:
scaling for the presentation of the first and second discrepancy indicators is effected in each case in one of at least two scalings.

10. The geodetic marking method as claimed in claim 8, wherein:
the scaling is effected manually or automatically on the basis of at least one of:
a distance between the target position and the marking unit position relative to a distance threshold value that is defined on the basis of the target position; and
a classification of the distance into defined range zones around the target position; and
the spatial discrepancy is taken as a basis for automatically providing a scaling recommendation.

11. A computer program product having program code, which is stored on a non-transitory machine-readable storage medium and that, when executed on an electronic data processing unit in the form of a control and processing unit for a surveying system as claimed in claim 1, performs a method for marking a target that is known in a coordinate system, the method including:
determining a marking unit position for a mobile marking unit;
capturing a camera image using a camera of a surveying appliance, and
presentation of the camera image on a display, together with the marking unit position and/or the target position, wherein:
a spatial discrepancy between the marking unit position and the target position is graphically presented on the output unit:
in a first direction using a first discrepancy indicator that indicates an interval from the target position to a plane defined by the surveying appliance and the marking unit; and
in a second direction using a second discrepancy indicator that indicates an interval from the target position to a normal to the plane, which normal is stipulated by the marking unit position; and
wherein the discrepancy in the first direction is presented independently of the discrepancy in the second direction.

* * * * *